Sept. 22, 1964     C. R. McBROOME     3,149,422
APPARATUS FOR USE IN CONSTRUCTION OF WELDED PIPE SYSTEMS
Filed Sept. 8, 1961     2 Sheets-Sheet 1

INVENTOR.
Cecil R. McBroome
BY
ATTORNEY.

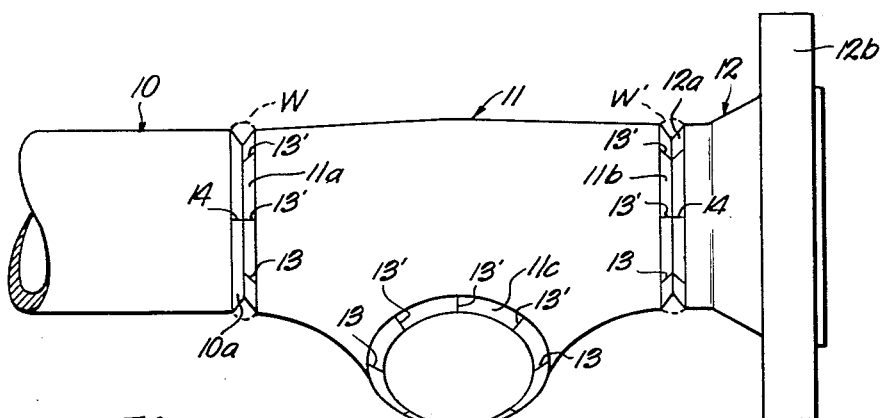
Fig. 5.
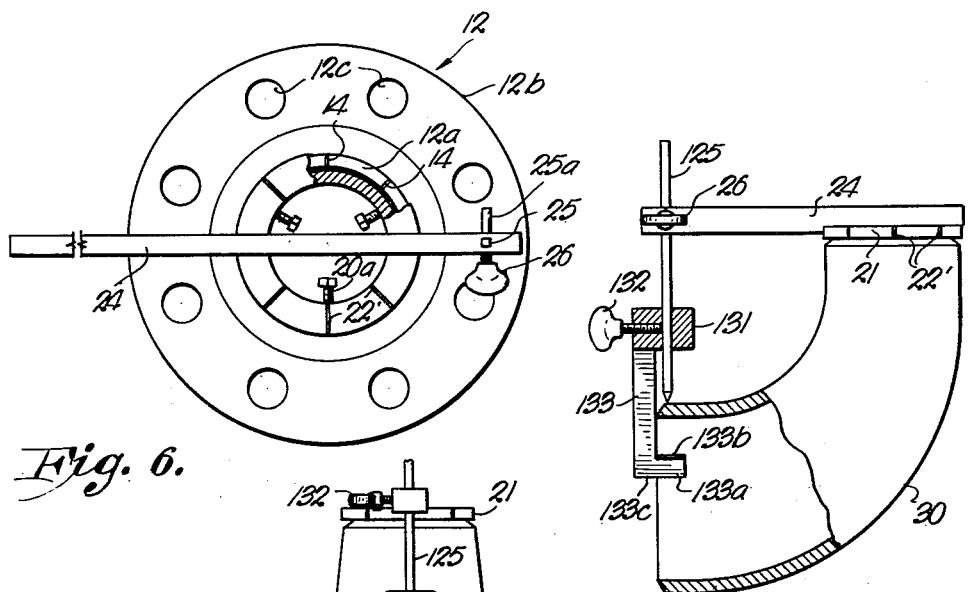
Fig. 6.
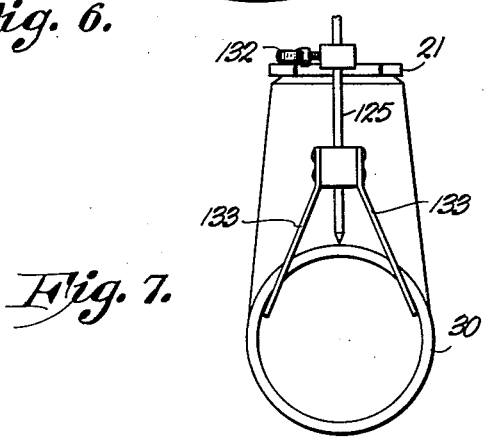
Fig. 7.
Fig. 8.
INVENTOR.
Cecil R. McBroome
BY Thos. E. Scofield
ATTORNEY.

United States Patent Office 3,149,422
Patented Sept. 22, 1964

3,149,422
APPARATUS FOR USE IN CONSTRUCTION OF WELDED PIPE SYSTEMS
Cecil R. McBroome, 1001 N. Kiger Road, Independence, Mo.
Filed Sept. 8, 1961, Ser. No. 136,861
9 Claims. (Cl. 33—189)

This invention relates generally to securing the proper alignment and orientation between fittings and other components of welded pipe systems.

In the assembly of welded pipe systems it is often necessary to insure that fittings, such as couplings, flanges, elbows and T's are joined with the pipe or with one another at an accurately measured orientation. This has posed substantial problems, largely because of the cumbersome nature of the fittings and because most often the positioning of the fittings has been attempted through the use of straight edges, stretched guide strings and other makeshift equipment or practices. To attempt to immobilize the fittings in the proper attitude during welding has required the services of at least two men. Moreover, the methods of determining the attitude of the fitting prior to and during welding which are known to me, leave much to be desired, not only in the way of achieving a proper initial setting, but also in preserving the desired setting during welding.

One of the principal objectives of the present invention is to provide a way of easily and rapidly fabricating a piping system with the fittings oriented in the system at accurately determined attitudes relative to one another. One of the most important features of my invention in this respect is that through the use of my invention a preselected angle of departure of elbows and T's or location of the bolt holes in flange couplings can be quickly and accurately set up prior to welding and maintained during the welding operation. Furthermore, the invention makes it possible for one man to both orient and weld a given fitting.

Briefly described, in my invention I have provided for the inclusion on the end edges of the fittings and pipe components of accurately inscribed index marks which can be matched against one another and utilized to establish the proper relationship between the abutting elements prior to and during the time of laying the final weld. The index marks are such that they are easily visible to the workman, yet do not interfere in any way with the achievement of a satisfactory welded joint. In the final assembly of the piping system, no levels, squares or the like are required to assist in lining up the fittings or other components and the hands of workmen can be devoted wholly to handling the fitting and the welding equipment.

Another highly important object of the invention is to provide a tool to be used in incorporating on standard fittings and pipe components index marks of the character described with ease and facility. Among the many advantages of the tool are its extreme simplicity, both in construction and manner of use; the capability it provides of accurately marking fittings, such as T's, elbows and coupling flange necks without requiring protractors, levels or the like; its ready adaptability to fittings of different inside and outside diameters and shapes; and its adaptability for use with standard tools, such as hack saws or other cutting implements readily available to any workman.

Other and further objects of the invention, together with the features of novelty appurtenant thereto will appear in the course of the following description.

In the accompanying drawings which form a part of the specification and are to be read in conjunction therewith, and in which like reference numerals indicate like parts in the various views;

FIG. 5 is a top plan view of an illustrative combination with a pipe end of a T fitting and flange with welding neck, the T shown with its lateral opening on an axis 45° from the horizontal, the ends of the fittings marked in accordance with the invention;

FIG. 6 is an end-on view of the tool applied to a coupling flange of the type shown in FIG. 5 and in position to be utilized for the inscription of index marks adjacent the end edge of the flange neck properly related to the bolt apertures of the flange;

FIG. 7 is an end elevation of an elbow fitting having mounted thereon a somewhat modified marking tool according to the invention; and FIG. 8 is a side elevation taken from the right hand side of FIG. 7.

Figure 1:
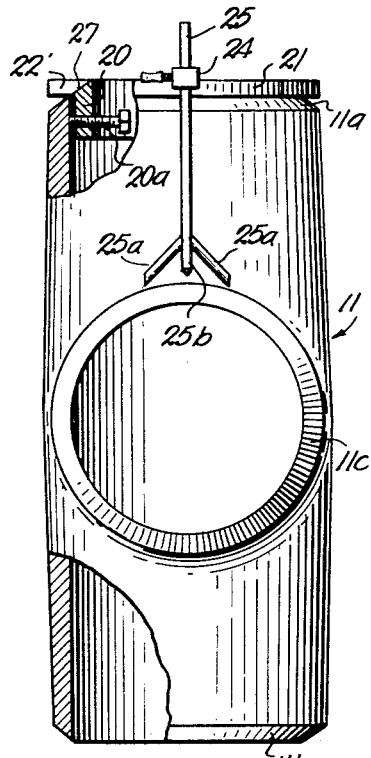
FIG. 1 is a plan view of a T fitting showing in conjunction therewith a preferred embodiment of a marking tool according to the invention, parts being broken away and in section for purposes of illustration.

Referring now to the drawings and initially to FIG. 5, reference numeral 10 indicates one end portion of a metal pipe of the type generally used in welded pipe fabrication or networks. The exterior of the pipe is bevelled, ordinarily by machining, to provide a conical end surface 10a which terminates at the end edge of the pipe. Butted against the end edge of the pipe 10 is a typical fitting 11, a T having been selected for purposes of illustration. Like the pipe, each end opening of the T 11 is formed to include a bevelled surface 11a, 11b or 11c, terminating at a relatively thin end edge. Another typical fitting 12 in the form of a welding neck coupling flange is in position at the far end of the T. This has the bevelled end surface 12a and the flange 12b, the latter of which is provided with bolt apertures 12c (see FIG. 6).

The manner of joining the components of the assembly with one another is well known to the art. Once the ends to be joined are abutted, the cavity formed by the bevelled surfaces is filled with a circumferentially extending weld joint as indicated by the broken lines and reference numerals W, W' in FIG. 5.

The foregoing description has been included to provide the necessary background for the subject matter of my invention.

It is a matter of common knowledge that bends or turns in a welded pipe system must be carefully oriented so that space clearances will be met, only sufficient pipe as is absolutely necessary will be used, and so the system will be geometrically neat. Care is taken in the designing of systems to meet all these contingencies, and it is imperative that in the actual fabrication the attitude of each fitting relative to the rest of the system follow with substantial accuracy the design layout.

For example, referring to FIG. 5, it will be assumed that the T 11 is specified as being so positioned that the central axis of its lateral opening is inclined from the horizontal at a predetermined angle. The particular angle shown in FIG. 5 is 45° from a horizontal plane. To provide a means of readily setting the T at the selected angle, I first inscribe in the bevelled surface 11a of the T a primary mark 13 which lies in a plane which also includes the axis of the lateral opening of the T, and utilize this as a reference plane for subscribing successive angular separated marks 13' on around the bevelled surface 11a.

While any angular increment may be used, I find that 45° increments provide the most practicable and easily used arrangement.

For reasons which subsequently will appear, I also provide the bevelled surfaces 11b and 11c with similar index marks, the primary marks (which are in the plane through the axis of the lateral opening) again bearing reference numeral 13, and the incremental marks 13'.

Prior to bringing the marked fitting 11 into abutting position with the pipe end, the latter is provided with a top center mark 14 which lies in a vertical plane through the axis of the pipe and establishes the proper reference point, in the example being given, against which to match the marks on the adjoining end of the fitting.

To set the fitting properly with respect to the pipe, the fitting is moved into the end abutting position of FIG. 5, and turned about its long axis until the index mark 13', 45° from the primary mark 13, is aligned with the pipe center mark 14. This establishes the proper angle for the axis of the lateral opening. While holding the fitting in the desired attitude, the weld seam W is laid to form the joint. Since the necessary measuring indicia is included as a part of the components of the system, no strings, squares or other paraphernalia are required during the welding operation to provide a frame or reference for the fitting, and there is no possibility of departure from the desired angle so long as the marks are maintained in proper matching relationship.

While it would be possible to provide the index marks at increments smaller than 45°, I find that the 45° increment is the most practicable and easily used. It is possible with the eye alone to closely approximate angular divisions between the 45°; thus, an angle of 40°, 50°, 60° or the like can easily be measured to the degree of accuracy required in such work.

As will be evident, by incorporating similar markings on the surface 12a of the flange neck, it is possible to orient the flange in the desired rotational position relative to the T 11. Flange marks 14 are inscribed in a predetermined relationship with the bolt holes, and by utilizing these marks to match against the marks 13, 13' of the fitting, the desired relationship between the bolt holes and the horizontal can be obtained. More will be said of this later.

Figure 2:
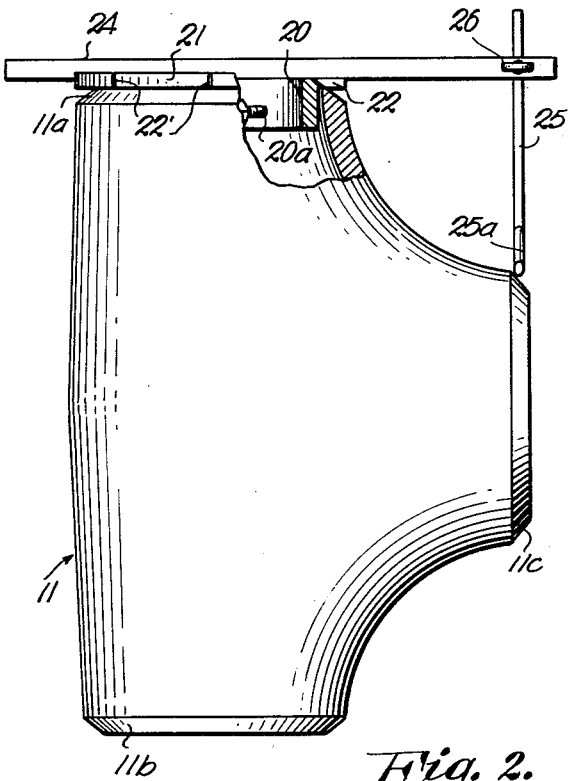
FIG. 2 is a side view taken from the left-hand side of FIG. 1, parts again being broken away and shown in section for purposes of illustration.
Figure 3:
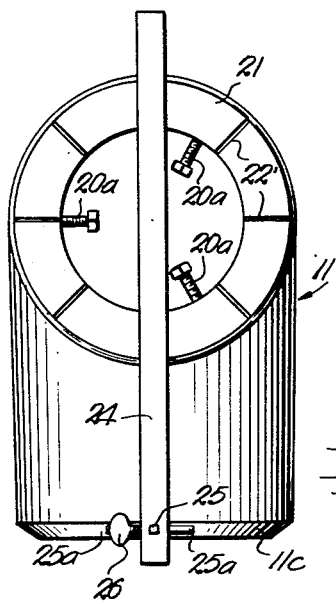
FIG. 3 is an end view taken from the upper end of FIG. 1.
Figure 4:
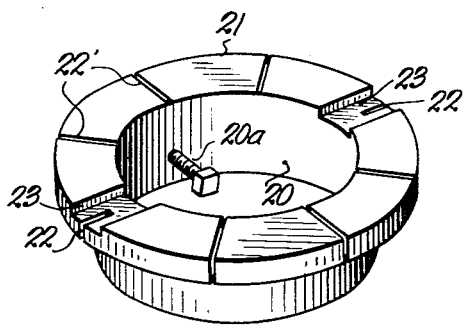
FIG. 4 is an enlarged perspective view of the marking guide portion of the tool, the crossbar having been removed.

FIGS. 1 through 4 illustrate a preferred form of tool for use in obtaining the proper markings on a previously unmarked T 11. This tool has a main body in the form of a cylindrical tubular portion 20 which is adapted to be inserted into an opening of the fitting and which carries at its outer end a radial flange or ring 21 overlying and engaging the end edge around the opening. Three equispaced internal set screws 20a extend laterally through the wall of the inserted tubular portion 20, and provide a means for releasably locking the insert to the fitting.

The flange 21 is provided with radial guide slots 22, 22' (see FIG. 4) which are open at the rim of the flange and proceed inwardly slightly past the inside wall of the fitting. The slots are provided at 45° increments around the flange 21. The two diametrically opposed slots 22 (FIG. 4) which coincide in location with a pair of grooves 23 of U-shaped cross section formed in the outer face of the flange, will be denoted as the primary slots.

The grooves 23 provide a retaining way for a crossbar 24 considerably greater in length than the outside diameter of the flange 21. The bar is provided with a cross section such that when placed across the flange in the grooves it is slidable lengthwise therein but will be maintained with its long axis in a fixed relation to the flange 21. Near one end of the bar is provided an appropriate aperture, through which extends in a slidable fit a rod or post 25 which is normal to the long axis of the bar. The aperture and rod are preferably polygonal, so as to prevent the rod from turning on its own axis while still preserving the feature of lengthwise adjustment of the rod relative to the bar. A wing bolt 26 is threaded into an appropriate aperture in one side of the bar and is adapted to releasably engage the rod to lock it at a desired lengthwise position.

The lower end of the rod terminates in a pair of diverging legs 25a, the legs being equiangular from the axis of the rod and of equal length with one another. Between the legs there is provided a center pointer 25 which is formed as a downward continuation of the rod at the juncture of the legs.

In utilizing the tool, the tubular portion 20 of the main body is inserted loosely into the end opening of the fitting, and the set screws 20a adjusted so that the flange 21 and tubular portion are substantially coaxial with the opening, but still free enough to be turned relative thereto. The rim of the flange is useful as a guide to obtaining the desired coaxial relationship and it is advisable to make the outside diameter of the flange similar to the outside diameter of the fittings with which the tool is to be used. The bar is laid in the grooves 23 and the entire tool assembly turned in the opening until the pointer 25b is approximately aligned with the center of the lateral opening of the T. During this preliminary adjustment the rod 25 can be shifted upwardly or downwardly as required to provide the necessary freedom of turning movement for the tool. The rod is then lowered, and the tool assembly rotatably adjusted until the ends of both legs 25a are in equal contact with the bevelled surface 11c. When this condition is achieved, the long axis of the bar 24 lies in a plane symmetrically bisecting the T and the primary slots 22 thus lie in the same plane. The set screws 20a are now tightened against the inside wall to lock the main body of the tool in this orientation.

The bar 24 is now removed and the fitting is ready for marking. Preferably the marking is done by inserting a blade of a conventional metal saw (not shown) successively into the respective slots 22, 22' and drawing it back and forth sufficiently to inscribe groove-like lines of the character at 13, 13' shown in FIG. 5 on the bevelled fitting surfaces. The primary slots 22 become accessible to the inscribing tool through the removal of the crossbar 24. The slots terminate at their respective inner ends with upwardly and inwardly inclined surfaces as shown at 27 in FIG. 1, thus to facilitate the manipulation of the saw and permit the cutting edge to register with the bevelled surface. Tools other than a saw may, however, be employed, a knife edge chisel capable of fitting within the slots being one example.

As will be evident, each opening of the fitting can be marked in accordance with the preceding description. The crossbar 24 and rod 25 are used to index the main body of the tool so that the slots 22, 22' are properly oriented relative to the adjacent lateral openings.

FIG. 6 illustrates the use of the tool in the marking of the end of the neck of a coupling flange 12 with marks 14, as shown in FIG. 5. By turning the bar 24 so that it coincides with or, alternatively, lies between the bolt apertures 12c, the neck can be inscribed in a preselected angular relationship with the apertures.

FIGS. 7 and 8 illustrate a modified form of the tool. In FIGS. 7 and 8 the main body of the tool is identical to that of the preceding embodiment, having the flange 21 provided with the slots 22 (not shown) and 22'. The bar 24 extends diametrically across the flange, again being retained in the grooves 23 of the preceding embodiment. There is also provided a rod 125 which is disposed normal to and slidably connected with the bar 24, a wing bolt or screw 26 being utilized to releasably lock the rod 125 at the desired longitudinal position.

The tool of FIGS. 7 and 8 differs from the tool of the preceding embodiment in that it permits the utilization of the inside surface of the fitting as the base for centering the long axis of the bar 24 in a plane which also contains the central axis of the lateral opening. The tool is illustrated in connection with the marking of an elbow 30.

It will be noted that slidably mounted on the rod 25 is a slide block 131 having a set screw 132 threaded into the block and adapted to releasably set against the rod. Secured to the slide block are diverging legs 133. These legs depart from the block at equal angles with respect to the vertical center line of the block and also are of equal length. At their lower ends the legs 133 are provided with inturned portions 133a which have parallel upper surfaces 133b. Obviously when the block and rod 125 are so adjusted that the edges 133b equally contact the inside surface of the end opening of the elbow, the rod 125 is in the vertical plane through the center of the end opening. By the same token, the long axis of the rod 24 lies in this plane, and therefore the slots 22, 22' are properly indexed to provide markings which are related to the reference plane.

It will be evident that the tool of FIGS. 7 and 8 can be utilized in the fashion of the preceding embodiment, that is, by utilizing the outside surface of the fitting to arrive at a center location for the rod 125. In this case the lower edges 133c of the legs 133 would be placed adjacent the outside surface and the bar 24 and associated main body of the tool turned in the upper opening until the edges 133c equally contact the outside pipe surface on opposite sides of the vertical center plane.

From the foregoing it will be seen that this invention is one well adatped to attain all of the ends and objects hereinabove set forth together with other advantages which are obvious and which are inherent to the method and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a pipe fitter's tool operable to provide a guide for inscribing index marks adjacent the end edge of an end portion of a pipe fitting, the combination of a positioning member adapted to be inserted axially into the end portion of said pipe fitting adjacent said end edge, an annular flange portion carried by said member and adapted to axially overlie the end edge of said pipe fitting when said member is inserted in the pipe fitting, said flange portion provided with a plurality of radial slots therethrough proceeding radially inwardly from the rim of the flange, said slots angularly spaced from one another around said flange, locating means associated with said flange and manually operable to locate said flange and positioning member in a position in which said slots are at a predetermined location relative to some other portion of said fitting, and locking means associated with said positioning member and operable to center said member in said fittting with said flange in near proximity to said end edge and lock same to the fitting with said slots in said location.

2. The combination as in claim 1 wherein said slots terminate at their inner ends radially inwardly of said end edge of said fitting.

3. In a pipe fitting tool operable to provide a guide for inscribing index marks adjacent one end edge of a pipe fitting having a pair of tubular end portions terminating in end edges whose center axes are transverse to one another, the combination of a positioning member adapted to be inserted axially into the end portion of said pipe fitting adjacent said one end edge, and annular flange carried by said member and adapted to axially overlie said one end edge of the fitting when said member is inserted in said end portion, said flange portion provided with at least one slot therethrough proceeding radially inwardly from the rim of the flange at least to the inside border of said one end edge, and locating means associated with said flange and extending laterally therefrom and terminating in a portion adjacent said other end edge portion of the fitting, said locating means providing a means for positioning said slot in a predetermined position relative to the center of said other end edge.

4. The combination as in claim 3 wherein said locating means includes a member extending transversely away from said flange and releasably connected therewith.

5. The combination as in claim 4 wherein the last named member comprises a bar extending diametrically of said flange, said flange having aligned oppositely disposed channels in the outer face thereof to receive the bar in a slidable fit, a pointer element connected with the outer end of said bar and extending laterally therefrom, and means connecting the pointer element with the bar for longitudinal adjustment of the latter with respect to the bar.

6. The combination as in claim 5 wherein said pointer element terminates in a pair of divergent legs having ends adapted to engage points on the wall of said other end portion and which when so engaged define a diametral longitudinal plane through said other end portion.

7. The combination as in claim 6 wherein said legs have ends which engage points on the exterior of said other end portion.

8. The combination as in claim 6 wherein said legs overlie the end edge of said other end portion and have ends insertable therein to contact the interior of said other end portion.

9. In a pipe fitter's tool operable to provide a guide for inscribing index marks adjacent the end edge of an end portion of a pipe fitting, the combination of a positioning member adapted to be inserted axially into said end portion adjacent said end edge, an annular flange portion carried by said member and of a width to axially overlie said end edge when said member is inserted into said end portion, said flange portion provided with a plurality of angularly spaced slots therethrough, each slot proceeding radially inwardly of the flange from the rim thereof, a bar member disposed diametrically across said flange and slidably seated thereon in grooves formed in the outer face of the flange, said bar member of greater length than the outside diameter of said flange, and a rod adjustably connected with said bar member near one end of the bar member, said rod extending generally parallel with the longitudinal center axis of said end portion.

References Cited in the file of this patent

UNITED STATES PATENTS

| | | |
|---|---|---|
| 1,133,585 | Simons | Mar. 30, 1915 |
| 1,314,184 | Clark | Aug. 26, 1919 |
| 1,342,872 | Sandell | June 8, 1920 |
| 2,192,904 | Ferris | Mar. 12, 1940 |
| 2,233,455 | Larson | Mar. 4, 1941 |
| 2,474,041 | Demmock | June 21, 1949 |
| 2,567,338 | Jock | Sept. 11, 1951 |
| 2,652,243 | Reed | Sept. 15, 1953 |
| 2,827,708 | Peu | Mar. 25, 1958 |

FOREIGN PATENTS

| | | |
|---|---|---|
| 159,761 | Germany | Apr. 10, 1905 |